(12) United States Patent
Mendelson et al.

(10) Patent No.: US 7,260,684 B2
(45) Date of Patent: Aug. 21, 2007

(54) TRACE CACHE FILTERING

(75) Inventors: Abraham Mendelson, Haifa (IL); Roni Rosner, Binyamina (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 09/764,810

(22) Filed: Jan. 16, 2001

(65) Prior Publication Data

US 2002/0095553 A1 Jul. 18, 2002

(51) Int. Cl.
*G06F 13/00* (2006.01)
*G06F 12/00* (2006.01)

(52) U.S. Cl. ............... 711/133; 711/134; 711/135; 711/136; 711/125

(58) Field of Classification Search ........... 711/125, 711/118, 133, 122, 134, 135, 136, 128; 717/128, 717/141; 712/233, 237
See application file for complete search history.

(56) References Cited

U.S. PATENT DOCUMENTS

| | | | |
|---|---|---|---|
| 5,381,533 A * | 1/1995 | Peleg et al. ............... 712/215 |
| 5,446,876 A * | 8/1995 | Levine et al. .............. 714/47 |
| 5,623,627 A * | 4/1997 | Witt ........................ 711/122 |
| 5,737,565 A * | 4/1998 | Mayfield .................. 711/213 |
| 5,862,371 A * | 1/1999 | Levine et al. ............. 712/228 |
| 5,944,815 A * | 8/1999 | Witt ........................ 712/207 |
| 5,999,721 A * | 12/1999 | Colglazier ................ 703/20 |
| 6,009,270 A * | 12/1999 | Mann ....................... 717/128 |
| 6,018,763 A * | 1/2000 | Hughes et al. ............ 709/213 |
| 6,018,786 A * | 1/2000 | Krick et al. ............... 711/4 |
| 6,052,700 A * | 4/2000 | Eckard et al. ............. 708/112 |
| 6,076,144 A * | 6/2000 | Peled et al. ............... 711/125 |
| 6,167,536 A * | 12/2000 | Mann ....................... 714/45 |
| 6,170,038 B1 * | 1/2001 | Krick et al. ............... 711/125 |
| 6,185,669 B1 * | 2/2001 | Hsu et al. ................. 712/205 |
| 6,202,126 B1 * | 3/2001 | Van Doren et al. ........ 711/118 |
| 6,205,545 B1 * | 3/2001 | Shah et al. ................ 712/237 |
| 6,216,206 B1 * | 4/2001 | Peled et al. ............... 711/133 |
| 6,237,065 B1 * | 5/2001 | Banerjia et al. ........... 711/133 |
| 6,272,598 B1 * | 8/2001 | Arlitt et al. ............... 711/133 |
| 6,282,616 B1 * | 8/2001 | Yoshida et al. ............ 711/133 |
| 6,295,644 B1 * | 9/2001 | Hsu et al. ................. 717/158 |
| 6,332,179 B1 * | 12/2001 | Okpisz et al. ............. 711/140 |
| 6,332,189 B1 * | 12/2001 | Baweja et al. ............. 712/238 |
| 6,351,844 B1 * | 2/2002 | Bala ........................ 717/128 |
| 6,393,522 B1 * | 5/2002 | Campbell .................. 711/120 |
| 6,397,296 B1 * | 5/2002 | Werner ..................... 711/122 |
| 6,397,302 B1 * | 5/2002 | Razdan et al. ............ 711/141 |
| 6,418,530 B2 * | 7/2002 | Hsu et al. ................. 712/237 |

(Continued)

OTHER PUBLICATIONS

Jim Handy, "The Cache Memory Book", 1993, Academic Press, pp. 37-107.*

(Continued)

*Primary Examiner*—Hong Kim
(74) *Attorney, Agent, or Firm*—Blakely, Sokoloff, Taylor & Zafman LLP

(57) ABSTRACT

A cache management logistics controls a transfer of a trace. A first cache couples to the cache management logistics to evict the trace based on a replacement mechanism. A second cache couples to the cache management logistics to receive the trace based on a number of accesses to the trace.

24 Claims, 8 Drawing Sheets

U.S. PATENT DOCUMENTS

| | | | | |
|---|---|---|---|---|
| 6,425,057 | B1* | 7/2002 | Cherkasova et al. | 711/134 |
| 6,453,411 | B1* | 9/2002 | Hsu et al. | 712/237 |
| 6,542,966 | B1* | 4/2003 | Crawford et al. | 711/133 |
| 6,604,060 | B1* | 8/2003 | Ryan et al. | 702/186 |
| 6,775,695 | B1* | 8/2004 | Sarukkai | 709/219 |
| 2001/0032307 | A1* | 10/2001 | Rohlman et al. | 712/219 |
| 2002/0066081 | A1* | 5/2002 | Duesterwald et al. | 717/128 |

OTHER PUBLICATIONS

Sato, T., Evaluating trace cache on moderate-scale processors, Computers and Digital Techniques, IEE Proceedings-, vol. 147 Issue: 6, Nov. 2000, pp. 369-374.*

Rakvic, R.; Black, B.; Shen, J.P., Completion time multiple branch prediction for enhancing trace cache performance, Computer Architecture, 2000. Proceedings of the 27th International Symposium on , 2000, pp. 47-58.*

Patel, S.J.; Friendly, D.H.; Patt, Y.N., Evaluation of design options for the trace cache fetch mechanism, Computers, IEEE Transactions on , vol. 48 Issue:2 , Feb. 1999, pp. 193-204.*

Rotenberg, E.; Bennett, S.; Smith, J.E., A trace cache microarchitecture and evaluation, Computers, IEEE Transactions on , vol. 48 Issue: 2 , Feb. 1999, pp. 111-120.*

Howard, D.L.; Lipasti, M.H., The effect of program optimization on trace cache efficiency, Parallel Architectures and Compilation Techniques, 1999. Proceedings. 1999 International Conference on, 1999, pp. 256-261.*

Black, B.; Rychlik, B.; Shen, J.P., The block-based trace cache, Computer Architecture, 1999. Proceedings of the 26th International Symposium on , 1999, pp. 196-207.*

Patel, S.J.; Evers, M.; Patt, Y.N., Improving trace cache effectiveness with branch promotion and trace packing, Computer Architecture, 1998. Proceedings. The 25th Annual International Symposim on, 1998, pp. 262-271.*

Friendly, D.H.; Patel, S.J.; Patt, Y.N., Putting the fill unit to work: dynamic optimizations for trace cache microprocessors, Microarchitecture, 1998. MICRO-31. Proceedings. 31st Annual ACM/IEEE nternational Symposium on , 1998, pp. 173-181.*

Friendly, D.H.; Sanjay Jeram Patel; Patt, Y.N., Alternative fetch and issue policies for the trace cache fetch mechanism, Microarchitecture, 1997. Proceedings., Thirtieth Annual IEEE/ACM International Symposium on , 1997, pp. 24-33.*

Rotenberg, E.; Bennett, S.; Smith, J.E., Trace cache: a low latency approach to high bandwidth instruction fetching, Microarchitecture, 1996. MICRO-29. Proceedings of the 29th Annual IEEE/ACM International Symposium on , 1996, pp. 24-34.*

"The cache Memory Book", Jim Handy, Academic Press, 1993, pp. 37-93.*

* cited by examiner

TRACE CACHE FILTERING

FIELD OF THE INVENTION

This invention relates to memory devices. In particular, the invention relates to cache memory devices.

BACKGROUND OF THE INVENTION

Modern high-end processors require high throughput front-ends in order to cope with increasing performance demand. Fetching a large number of useful instructions (e.g., instructions residing on the correct path) per cycle is relatively easy task if those instructions are arranged sequentially. However, on an average every few instructions there is a branch instruction. Therefore, fetching a large number of useful instructions per cycle requires accurate prediction of multiple branch targets and the assembly of instructions from multiple non-contiguous cache blocks is a more difficult task.

One way of increasing the effectiveness of conventional fetch is reducing the number of fetch discontinuities along the execution path of the program. Loop unrolling, code motion, and branch alignment are a few examples of compiler techniques that reduce the number taken branches and, subsequently, instruction stream discontinuities in programs executions. Special Instruction Set Architectures (ISAs) have also been proposed to better express such compiler optimizations to the hardware. A trace cache is an instruction memory component that stores instructions in the order they are executed rather than in their static order as defined by the program executable. Trace cache is becoming an important building block of modern, wide-issue processors. Trace-caches have been shown to effectively increase the number of useful instructions that can be fetched into the machine (i.e., processor), thus increasing the average number of instructions the machine can execute each cycle. Trace-cache research has been focused on increasing fetch bandwidth for a given die area. Techniques that aim to improve instruction bandwidth severely increase the number of traces built during the execution. This causes degradation in the performance or power of the system since trace-cache consumes large power when active. Therefore, there is a need to have a trace cache organization that would reduce the number of trace built during the execution without performance or power degradation.

BRIEF DESCRIPTION OF THE DRAWINGS

The features and advantages of the present invention will become apparent from the following detailed description of the present invention in which.

DETAILED DESCRIPTION OF THE INVENTION

In the following, for purposes of explanation, numerous details are set forth in order to provide a thorough understanding of the present invention. However, it will be apparent to one skilled in the art that theses specific details are not required in order to practice the present invention. In other instances, well-known electrical structures and circuits are shown in block diagram form in order not to obscure the present invention.

Figure 1A:
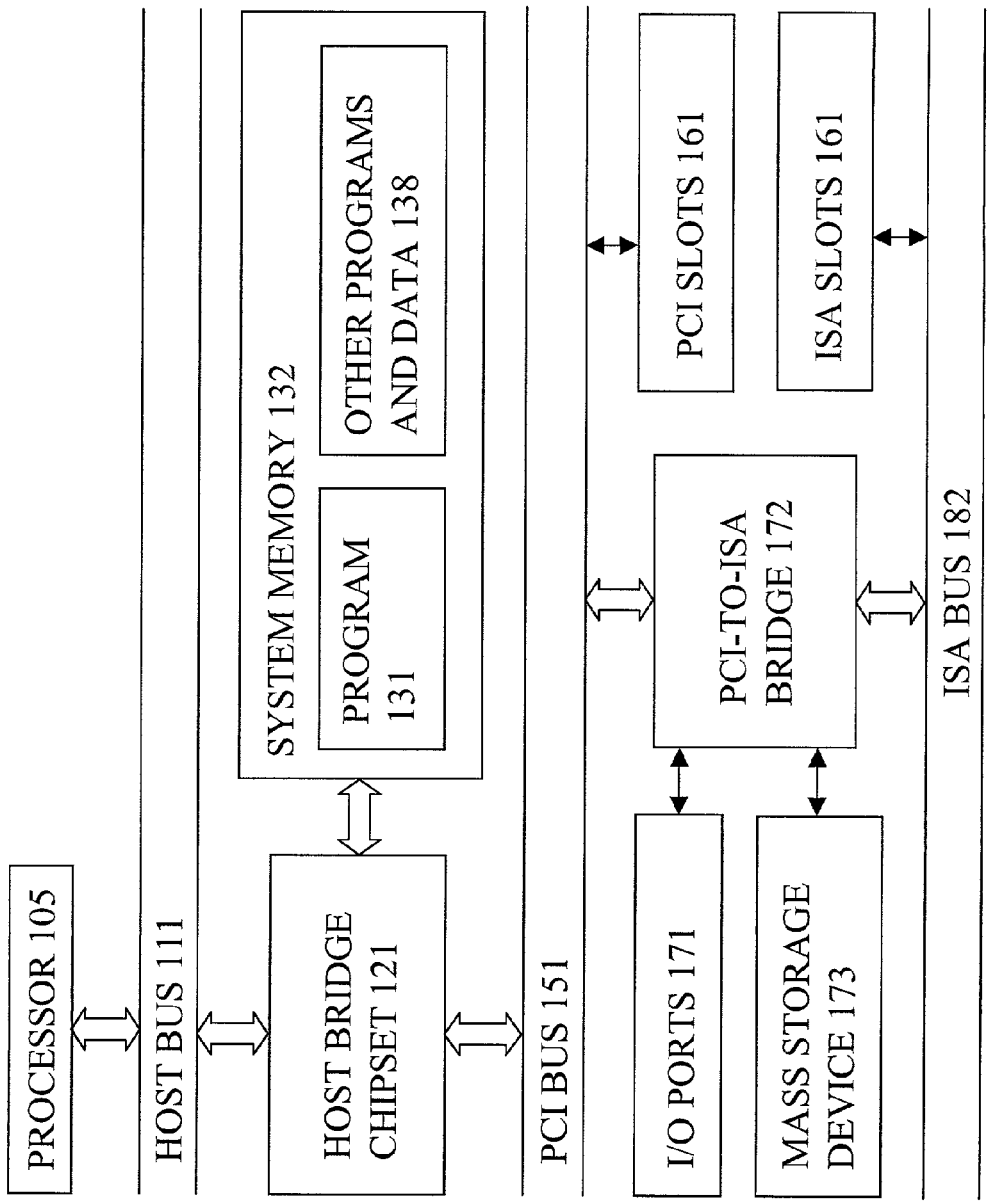
FIG. 1A is a diagram illustrating a computer system in which one embodiment of the invention can be practiced.

FIG. 1A is a diagram illustrating a computer system 100 in which one embodiment of the present invention can be practiced. The computer system 100 includes a processor 105, a host bus 111, a host bridge chipset 121, a system memory 132, a peripheral component interconnect (PCI) bus 151, PCI slots 161, a PCI-to-industry standard architecture (ISA) bridge 172, mass storage device 173, Input/Output (I/O) ports 171, an ISA bus 182, and ISA slots 181.

The processor 105 represents a central processing unit (CPU) of any type of architecture, such as complex instruction set computers (CISC), reduced instruction set computers (RISC), very long instruction word (VLIW), or hybrid architecture. It is noted that the present invention can be practiced with a single processor or multiple processors.

The host bridge chipset 121 includes a number of interface circuits to allow the host processor 105 accesses to the system memory 132 and the PCI bus 151. The system memory 132 represents one or more mechanisms for storing information. The system memory 132 may contain program 131, and other programs and data 138. The PCI slots 161 provide interfaces to PCI devices. Examples of PCI devices include the network interface and the media interface.

The PCI-to-ISA bridge 172 provides access to the ISA bus 182, mass storage devices 173, and input/output (I/O) ports 171. The I/O ports 171 provides interface to the I/O devices. The mass storage device 173 stores archive information such as code, programs, files, data, applications and operating systems. The mass storage device 173 provides a mechanism to read machine-readable media. The ISA bus 182 has a number of ISA slots 181 to interface to ISA devices. In a system where multiple processors are utilized, it is typical for multiple processors to share the main system memory 132 and/or mass storage device 173.

Figure 1B:
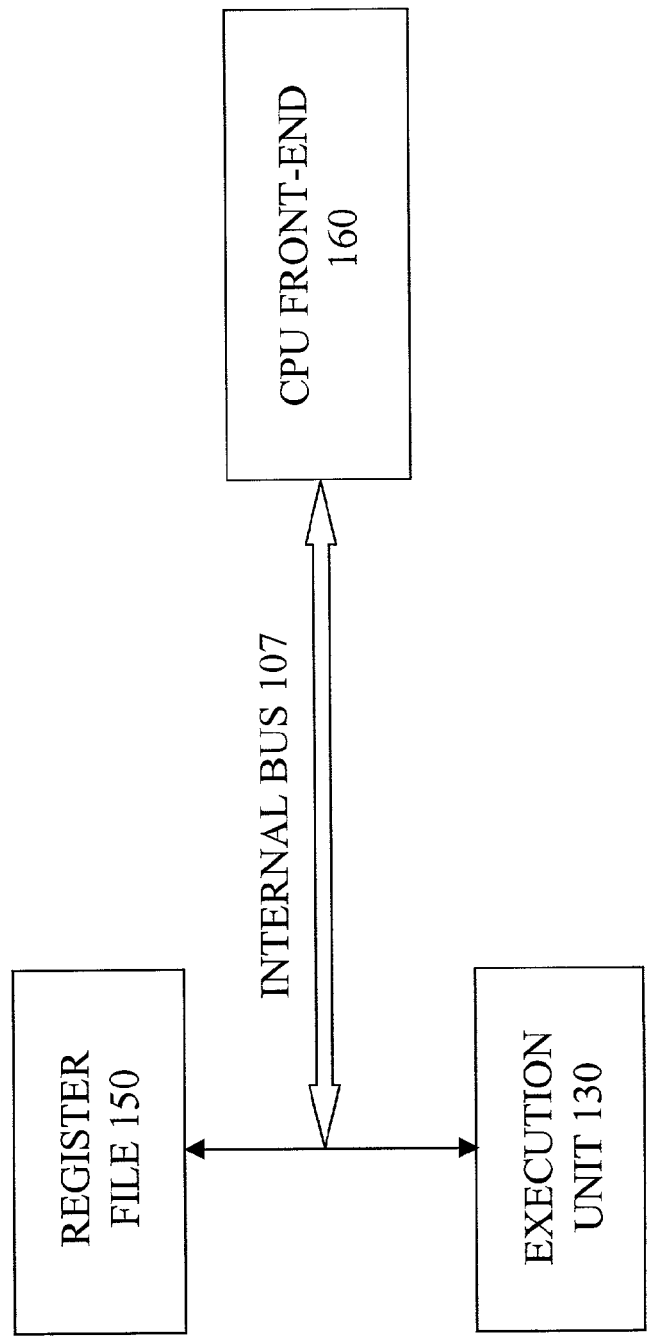
FIG. 1B is a diagram illustrating the processor core in FIG. 1A according to one embodiment of the invention.

FIG. 1B is a diagram illustrating the processor 105 according to one embodiment of the present invention. The processor 105 includes an execution unit 130, a register file 150, and a Central Processing Unit (CPU) front-end 160.

The execution unit 130 is the processing core of the processor 105 for executing the various processor instructions. The register file 150 is a set of general-purpose registers for storing (or saving) information required by the execution unit 130. There may be more than one register file in more advanced system. The CPU front-end 160 couples to internal bus 107 and is responsible for fetching instructions from the program memory, decoding them and delivering a high throughput stream of instruction for execution. A cache system of the CPU front-end 160 plays a major role in enabling high throughput of instruction issue. In some systems, the cache memory is actually split into two sections, one section for caching data and one section for caching instructions. However, for the purpose of explaining the present invention, the various caches described in the present invention are caches with instructions. Furthermore, it should be appreciated that the processor 105 typically includes many more components, which are not necessary for understanding the invention.

Figure 1C:
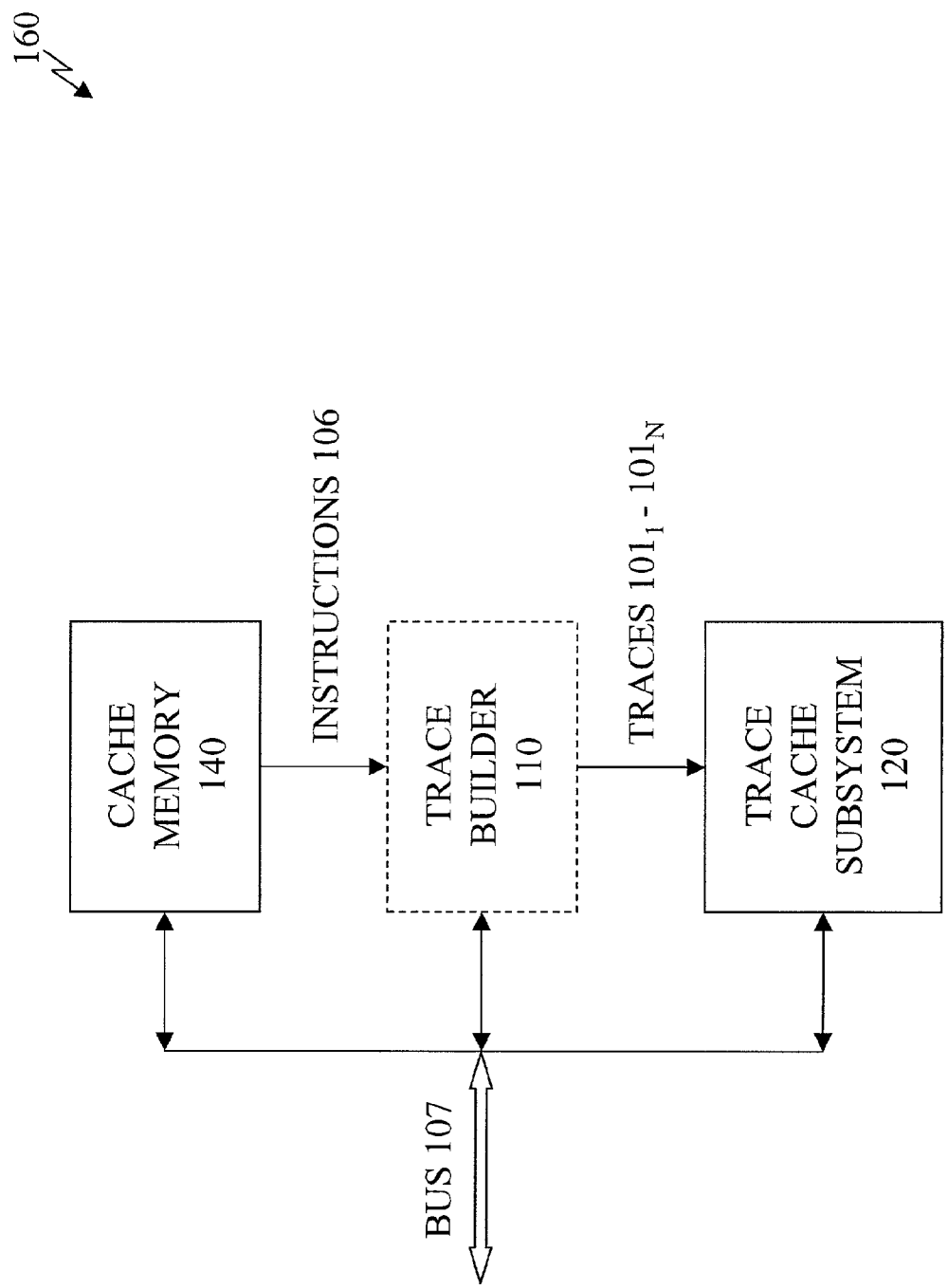
FIG. 1C is a diagram illustrating the CPU front end in FIG. 1B according to one embodiment of the invention.

The trace builder 110 exams dynamic instruction stream 106, selects and collates common instruction sequences. The sequences are fetched from the cache memory 140 and are built into traces $101_1$ to $101_N$ ("N" being a positive whole number). The traces $101_1$ to $101_N$ are built by an iterative process. In the iterative process, instructions are fetched from the CPU front-end 160, decoded and executed by the execution unit 130, and added to a trace cache subsystem 120 (see FIG. 1C) by the trace builder 110. The building of a trace depends mainly on the termination criterion, the test that determines where the trace ends and a new trace begins. The criterion may be a composite criterion with static/fixed or dynamic/adaptive conditions and configurable parameters FIG. 1C is a diagram illustrating the CPU front-end 160 in FIG. 1B according to one embodiment of the present invention. The CPU front-end 160 includes a cache memory 140, a trace builder 110, and a trace cache subsystem 120.

In one embodiment, the cache memory 140 is an instruction cache that is built into the architecture microprocessors. The cache memory 140 may be an internal cache from a plurality of internal caches of the architecture microprocessors. It is noted that this type of cache is sometimes called Level 1 (L1) cache.

The trace cache subsystem 120 provides the system 100 with an improved processor performance and lower power consumption. Higher performance is due to the higher instruction delivery and fewer pipeline stages. Lower power is due to the saving of repeated operations. The trace cache subsystem 120 takes traces $101_1$ to $101_N$ and stores them in one of several trace caches located in the trace cache subsystem 120.

Many of traces $101_1$ to $101_N$ that are inserted into trace cache subsystem 120 are rarely used again before being replaced. The enhancement suggested herein to the architecture of the trace cache subsystem 120 is designed to help decrease the number of traces built by identifying the fewer but frequently used traces and maintaining them within the trace-cache subsystem 120. This reduces the overall execution time and power consumption. It also enables instruction trace optimizations to be used without performance or power degradation.

The trace caches in the trace cache subsystem 120 are designed using the hierarchy concept. The hierarchy concept is a well-used concept in the construction of memory systems. A hierarchy provides progressively slower access to a progressively larger working set. This reduces the sensitivity of the system to the performance of its slowest component. In one embodiment, additional level of trace-cache reduces the number of builds especially for large footprints applications. The execution unit 130 extracts traces from one or more of the several trace-caches in the trace cache subsystem 120 and performs an execution process.

Figure 2:
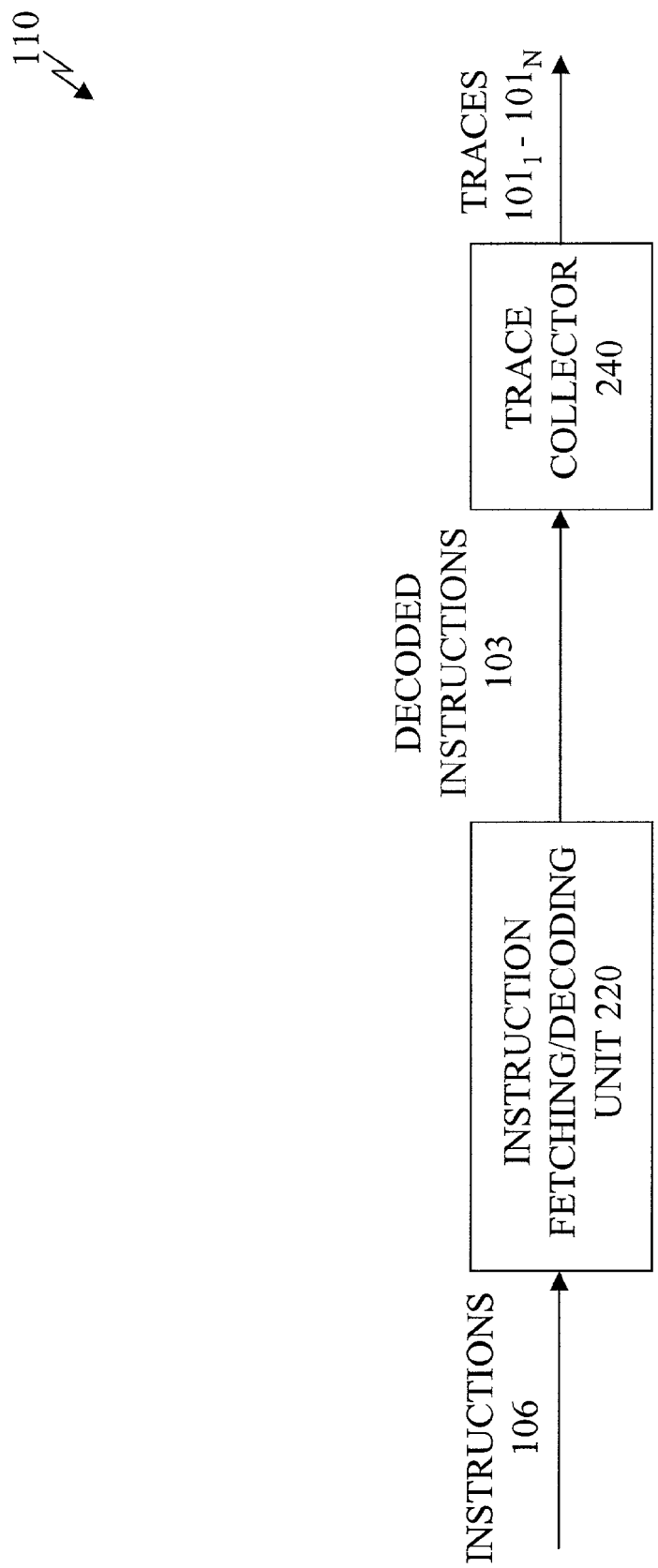
FIG. 2 is a diagram illustrating the trace builder in FIG. 1C according to one embodiment of the invention.

FIG. 2 is a diagram illustrating the trace builder 110 in FIG. 1B according to one embodiment of the invention. The trace builder 110 includes an instruction fetching/decoding unit 220 and a trace collector 240.

The instruction fetching/decoding unit 220 fetches instructions 106 from the cache memory 140. The instructions 106 are the instructions of program that will be executed to produce fetched instructions. The unit 220 then decodes the fetched instructions for execution by the execution unit 130 and also forwards them to the trace collector 240.

The trace collector 240 collects traces $101_1$ to $101_N$ and stores these traces $101_1$ to $101_N$ in the trace cache subsystem 120. The trace collector 240 collects the traces $101_1$ to $101_N$ by storing the decoded instructions in sequence as they are fed into the execution unit 130. The trace collector 240 takes the decoded and executed instructions and creates traces $101_1$ to $101_N$. A trace is defined as a sequence of basic blocks that have been executed consequently by the program. A trace is identified by its starting address and its branch outcomes. Different traces may be built out of the same entry point. Each one of the traces $101_1$ to $101_N$ may contain multiple basic blocks and, in one embodiment, multiple traces may begin at the same basic-block address. Each trace in the traces $101_1$ to $101_N$ may be uniquely identified by a tag composed by the sequence of branch decision (taken/not taken) along the trace.

As discussed earlier, the trace building process used by the trace builder 110 is an iterative process in which instructions are fetched, decoded, and added to the trace cache subsystem 120. The iterative process is carried out by the trace builder 110 shown in FIG. 2. One of the factors that may control the quality and utility in the creation of traces $101_1$ to $101_N$ is the termination criterion. The termination criterion is a test that determines where a trace ends and a new trace begins. In one embodiment, the criterion is a composite criterion with a plurality of fixed conditions and a plurality of configurable parameters such as number of instructions, number of branches, special instructions like call, return, etc.

Figure 3:
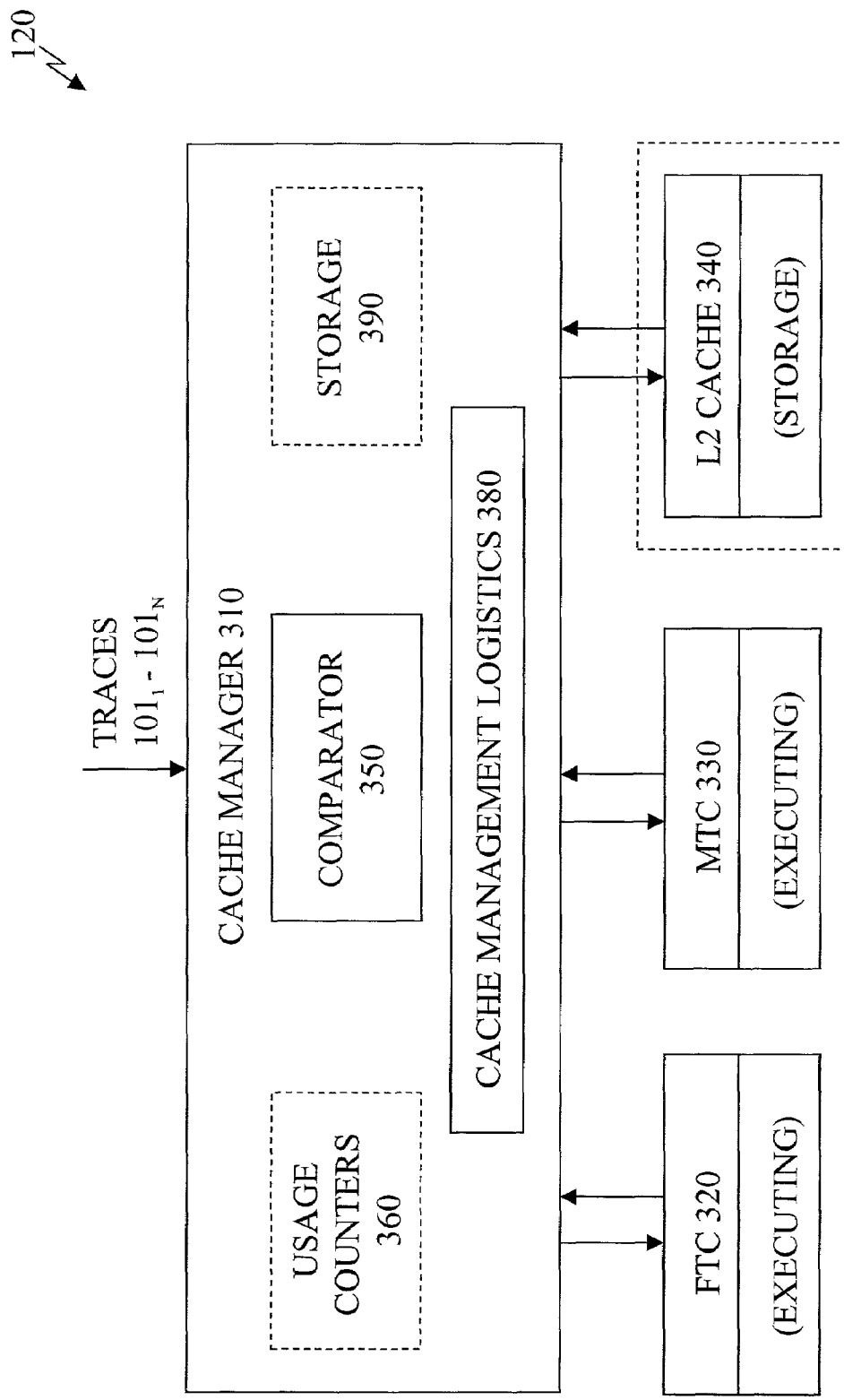
FIG. 3 is a diagram illustrating the enhanced trace cache subsystem in FIG. 2 according to one embodiment of the invention.

FIG. 3 is a diagram illustrating a trace cache subsystem 120 according to one embodiment of the invention which exhibit the enhancements suggested in the present invention. The trace cache subsystem 120 includes, among other things, a cache manager 310, a filter trace cache (FTC) 320, and main trace cache (MTC) 330.

In general, a trace cache may hold original instructions, annotated/decoded instructions, microoperations, etc. The actual content of the trace cache is not relevant to the trace cache subsystem 120. In one embodiment, the trace cache subsystem 120 contains decoded instruction 103 (see FIG. 2).

The trace cache subsystem 120 provides a filtering mechanism to separate and distinguish traces that are heavily used from those that do not show locality of reference. Each entry is capable of storing one maximal-size trace. The sets are managed using a cache replacement policy such as a Least Recently Used (LRU) one. However, other replacement policies may also be used. Each trace in the traces $101_1$ to $101_N$ has an access counter counting accesses to the trace since it was inserted into a particular trace cache.

The cache manager 310 manages, controls and transfers traces in the traces $101_1$ to $101_N$, between the different caches (e.g., FTC 320, MTC 330) in the cache subsystem 120 according to the different filtering policies and cache organizations. Also, the cache manager 310 manages the storage and supply of traces according to its configuration. The cache manager 310 includes a cache management logistics 380, a comparator 350 and storage 390. In addition to using a replacement policy in trace cache subsystem 120, usage counters $360_1$ to $360_N$ are attached to traces $101_1$ to $101_N$, respectively. The usage counters $360_1$ to $360_N$ are used to count the number of accesses to the traces $101_1$ to $101_N$, respectively. Evicted traces are sent to the cache-management logic 310 together with their usage counters for further processing.

The trace cache subsystem 120 is split into two trace caches, the FTC 320 and the MTC 330. Every fetch is attempted in both FTC 320 and MTC 330. If there is a hit, the trace from the traces $101_1$ to $101_N$ is fetched from either the FTC 320 or the MTC 330 and further process continues. No cache transfers are made because no new trace is built. The information used in the replacement mechanism and the trace counter corresponding to the hit trace are updated. On a cache miss, however, a new trace is build and is entered into the FTC 320. The access counter of this new trace is set to a predetermined number (i.e., one). When a new trace is built, it may require the replacement of an existing trace in the FTC 320. The destination of this trace depends on its access counter value. If the value is below a certain threshold value, the trace is simply overwritten (i.e., discarded from the trace cache subsystem 120). However, if the number in its access-counter is equal or above the threshold value, the trace is moved to the MTC 330. It is noted that the threshold value may be fixed or may be varied.

The filter trace cache (FTC) 320 performs the filtering process. Traces $101_1$ to $101_N$, upon build, are first inserted into the FTC 320. They stay in the FTC 320 as long as new traces do not evict them. When the traces are to be replaced, a decision is to be made on whether to discard them or move them to the MTC 330, based on their respective number of accesses. In other words, the FTC 320 filters traces $101_1$ to $101_N$ into discarded traces and kept ones. When traces from traces $101_1$ to $101_N$ are evicted from the FTC 320, the evicted traces are either discarded or kept. The kept traces are moved to the MTC 330 for long term storage. The decision to discard or promote a trace in traces $101_1$ to $101_N$ depends on several criteria and factors. These criteria and factors may include the frequency at which traces $101_1$ to $101_N$ are used, their lifetime within the FTC 320, and their space utilization. It is noted that trace lookups in the FTC 320 and the MTC 330 are done in parallel.

In one embodiment, the decision to discard or to keep the trace depends on the frequency of the number of access on that particular trace. The number of accesses of the traces $101_1$ to $101_N$ is available from the usage counters $360_1$ to $360_N$, respectively. A threshold number "J" ("J" being a positive whole number) may be predetermined and store in the storage 390. The threshold number "J" may also be dynamically adjusted. When a trace in the traces $101_1$ to $101_N$ is to be evicted from the FTC 320, the threshold number J is used to compare to the number of access from a usage counter corresponding to that particularly trace. When a trace is needed to be evicted from the FTC 320, the comparator 380 compares the stored threshold number J to the number of accesses extracted the usage counters $360_1$ to $360_N$. If the number of access is equal to or higher than the threshold number "J", the trace is moved to the MTC 330. In one embodiment, the threshold "J" is preset at a fixed number. In another embodiment, the threshold "J" is dynamically adjusted. The comparator 380 compares the number of access of the next evicted trace from the traces $101_1$ to $101_N$ to the threshold number "J" and if it is determined that this trace has been accessed more than the threshold "J" prior to its eviction from the FTC 320, it is assumed that this trace is useful and therefore, it may be used again. This trace is then transferred to the MTC 330. If the number of accesses is less than "J", this trace is discarded.

The traces that are discarded are called cold traces and the traces that are transferred to the MTC 330 are called hot traces. Hot traces and cold traces are determined based of the their frequent or infrequent usage respectively. In other words, cold traces are traces that are infrequently been used and hot traces are traces that are frequently used. In one embodiment, the hot traces may be called frequent traces and this group of the frequent traces is a subset of the traces $101_1$ to $101_N$. It is essential to the present invention that these frequent traces are detected according to their corresponding usage counters. These usage counters may be transferred or are reset before being transferred along with frequent traces to the MTC 330. The MTC 330 stores the frequent traces together with their respective usage counters. These frequent traces may be extracted directly from the MTC 330 for execution in the execution unit 130 at any time.

An extension of the filtering concept involves adding a second level (L2) trace-cache, the L2 trace-cache 340. One of the differences between the traditional L2 cache and the L2 trace-cache 340 may be that the L2 trace-cache 340 contains traces whereas the L2 cache contains data or instructions that have not been built into a trace. The L2 trace-cache 340 is added to the FTC 320 and the MTC 330 structure to reduce the number of builds for large footprint applications. It is noted that the same size or different sizes may be used for FTC 320, MTC 330, and L2 trace cache 340.

The trace cache subsystem 120 may further include a Level 2 (L2) trace cache 340. The L2 trace cache 340, however, may be external to the trace cache subsystem 120. The functionality of the L2 trace cache 340 may not be affected by its location (i.e., external or internal to the trace cache subsystem 120). It is appreciated that the present invention is described in reference to a serially arranged trace cache hierarchy system, but it needs not be limited strictly to such a hierarchy.

As observed from the experiments, the FTC/MTC pair effectiveness is limited in case the application footprint is large. In such cases, the number of capacity misses is going up and it becomes difficult to reduce the number of builds without increasing the actual size of the cache. To accommodate this case, the L2 trace cache is introduced.

The main idea and replacement policies in the FTC/MTC/L2 architecture may be similar to the previously described trace caches FTC/MTC architecture. Traces evicted from either the FTC 320 or the MTC 330 while their access counter exceeding certain threshold value are transferred for storage in the L2 trace cache. Again, this threshold value may be fixed or may be dynamically adjusted. A zero value, meaning all evicted lines are moved to L2 is possible.

The L2 trace cache is combined with the FTC/MTC pair to generate an FTC/MTC/L2 structure. As discussed above, a trace evicted from the FTC 320 is either discarded from the trace memory altogether or move from the FTC 320 to the MTC 330 based on its access counter. A trace evicted from the MTC 330 is also either discarded or moved to the L2, based on its access counter. This may be based on its MTC accesses alone or its combined FTC/MTC accesses. A trace from L2 that is accessed is copied back to the MTC 330 and is then fetched for execution.

The operation of trace build from conventional memory is more expensive than bookkeeping operations such as the transfer of traces from one level in the hierarchy to another, both in terms of power consumption and in terms of added delays. The power and performance gain related to reduction in the number of builds due to the introduction of the L2 trace cache 340 may be higher than the loss due to the extra booking overhead measured by a much larger number of transfer.

The L2 trace-cache 340 stores traces that are evicted from the MTC 330 (or, in another embodiment, from the FTC 320). To select which of the frequent traces store in the MTC 330 to transfer to the L2 trace-cache 340. The selection depends on certain criterion or conditions. The criteria or conditions may be same or different as the criteria or conditions as discuss in the filtering process in the FTC 320. The area allocation for the L2 trace-cache 340 may be equivalent or larger than the total area of executing caches in each of the considered configurations. Experiments conducted regarding the filtering concept that involves additional L2 trace-cache 340 proves that L2 trace-cache 340 is useful for applications with larger instruction footprints.

It is observed from experiments that the L2 trace-cache 340 decreases the number of builds when added to the basic trace cache configuration and by much more when added to the FTC/MTC configuration. In other words, the L2 trace cache 340 has an even greater positive impact in the presence of the FTC 320.

It is also observed from these experiments that even though the reduced percentage in the number of trace builds vary from one application to another, they exhibit the same pattern. Specifically, the largest improvement is obtained when L2 trace-cache 340 is added to the FTC 320/MTC 330 configuration.

It is assumed that the power and performance gain related to the reduction in the number of builds due to the introduction of the L2 trace-cache 340 are significantly higher that the loss due to the extra bookkeeping overhead measured by a much larger number of transfers.

Figure 4A:
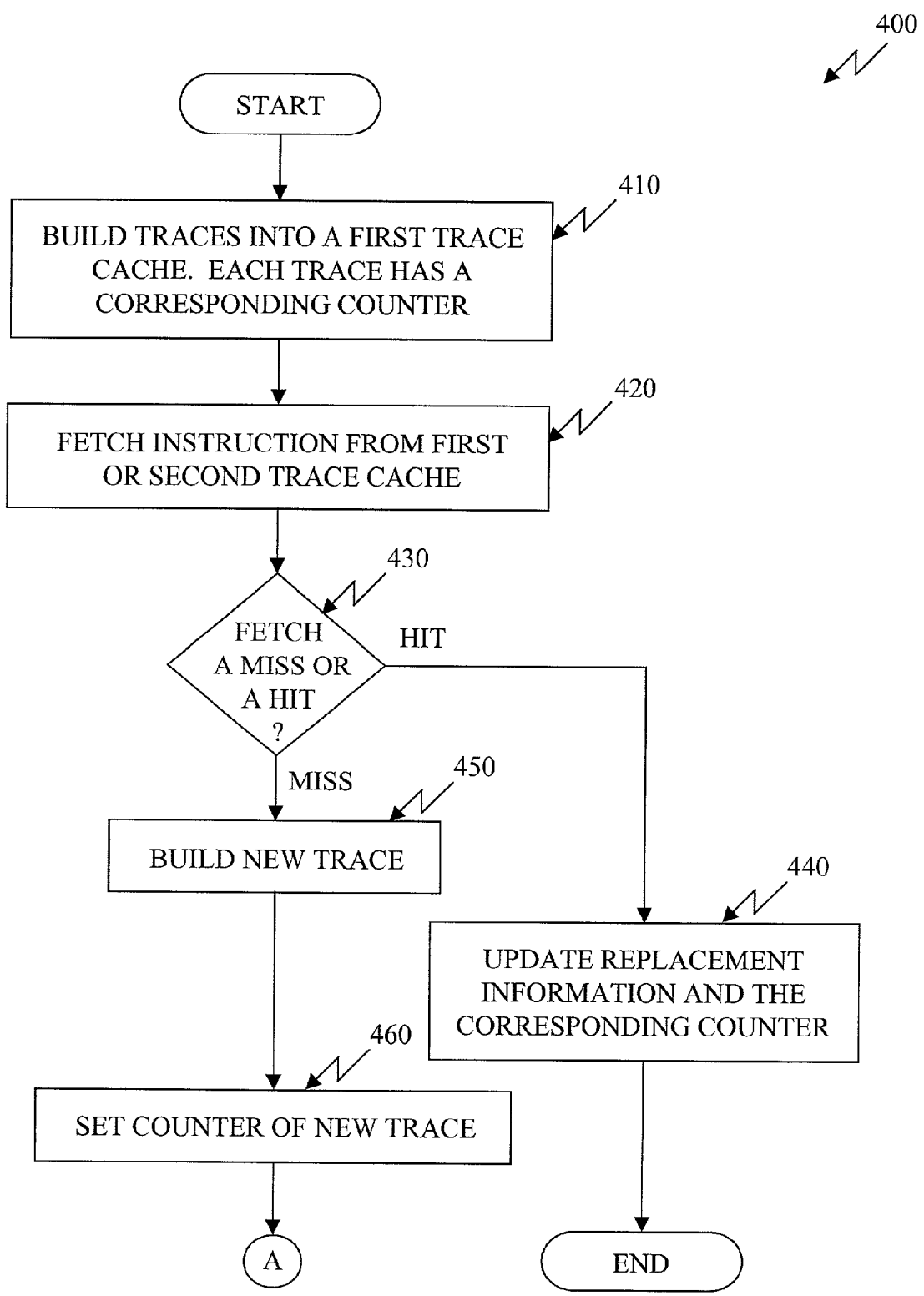
FIGS. 4A and 4B are flowcharts illustrating a filtering process according to one embodiment of the present invention.
Figure 4B:
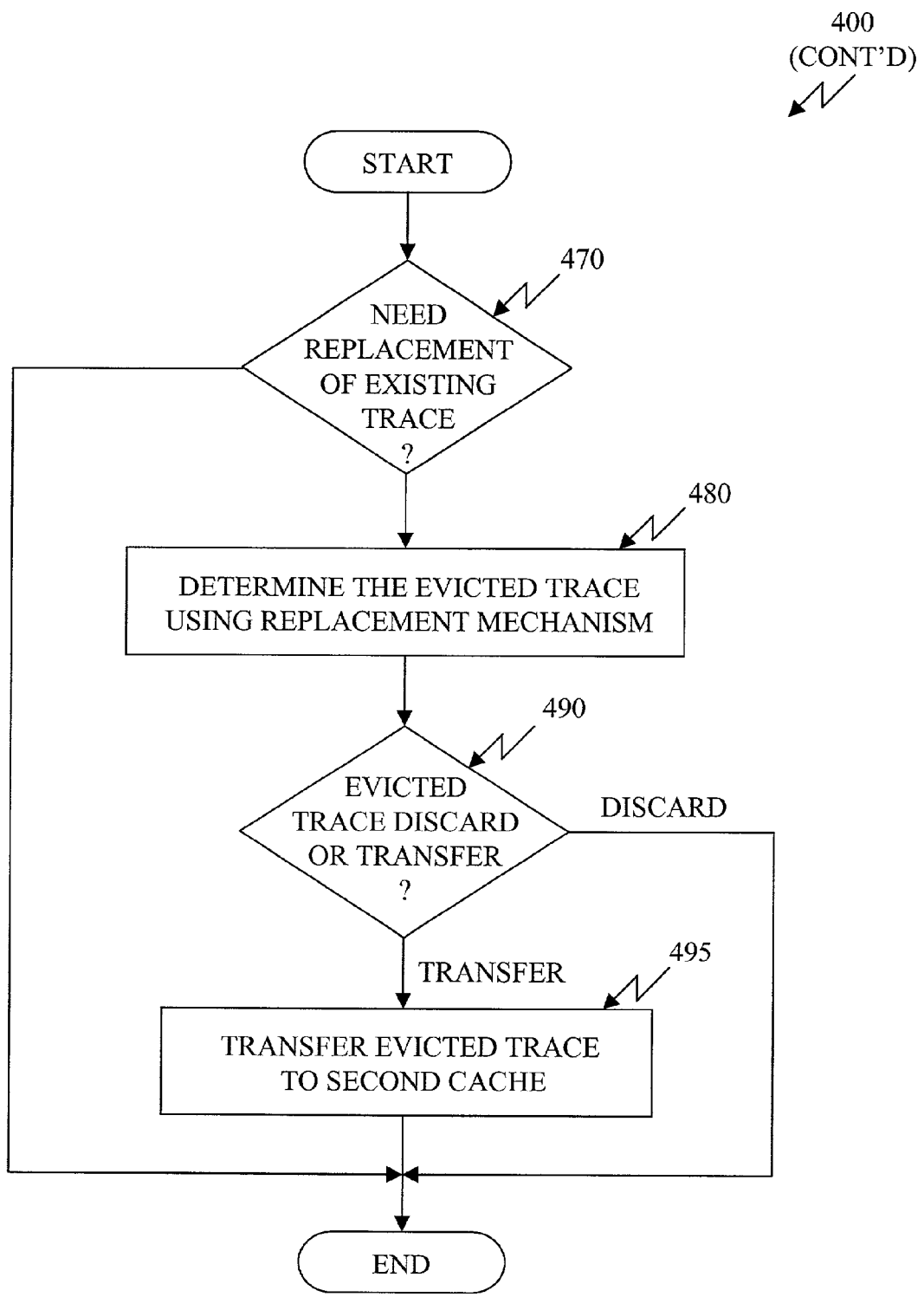

FIGS. 4A and 4B are flowcharts illustrating a filtering process according to one embodiment of the present invention.

Upon START, the process 400 builds traces into a first trace cache (Block 410). Each trace has a corresponding counter. The first trace cache is defined as the filter trace cache (FTC). Next, the process fetches an instruction of a trace from the first trace cache or from a second trace cache for execution (Block 420). The second trace cache is defined as the main trace cache (MTC). Then the process 400 determines whether the fetched instruction is a miss or a hit (Block 430). If it is a hit, the process 400 updates the replacement information used (i.e., LRU policy) and also updates the counter corresponds to the hit trace (Block 440). The process 400 is then terminated. On the other hand, if it is a miss, the process 400 builds a new trace (Block 450). Next, the process 400 sets the counter of the new trace (i.e., to 1) (Block 460). The process 400 then determines whether there is a need for replacing an existing trace in the first trace cache (Block 470). If not, the process 400 is terminated. Otherwise, the process 400 determines which trace from the first trace cache is to be evicted by using the replacement mechanism (Block 480). Once the evicted trace is determined, the process 400 continues to determine whether the evicted trace is to be discarded (i.e., overwritten) from the first trace cache or to be transferred to the second trace cache (Block 495). The process 400 is terminated.

Figure 5:
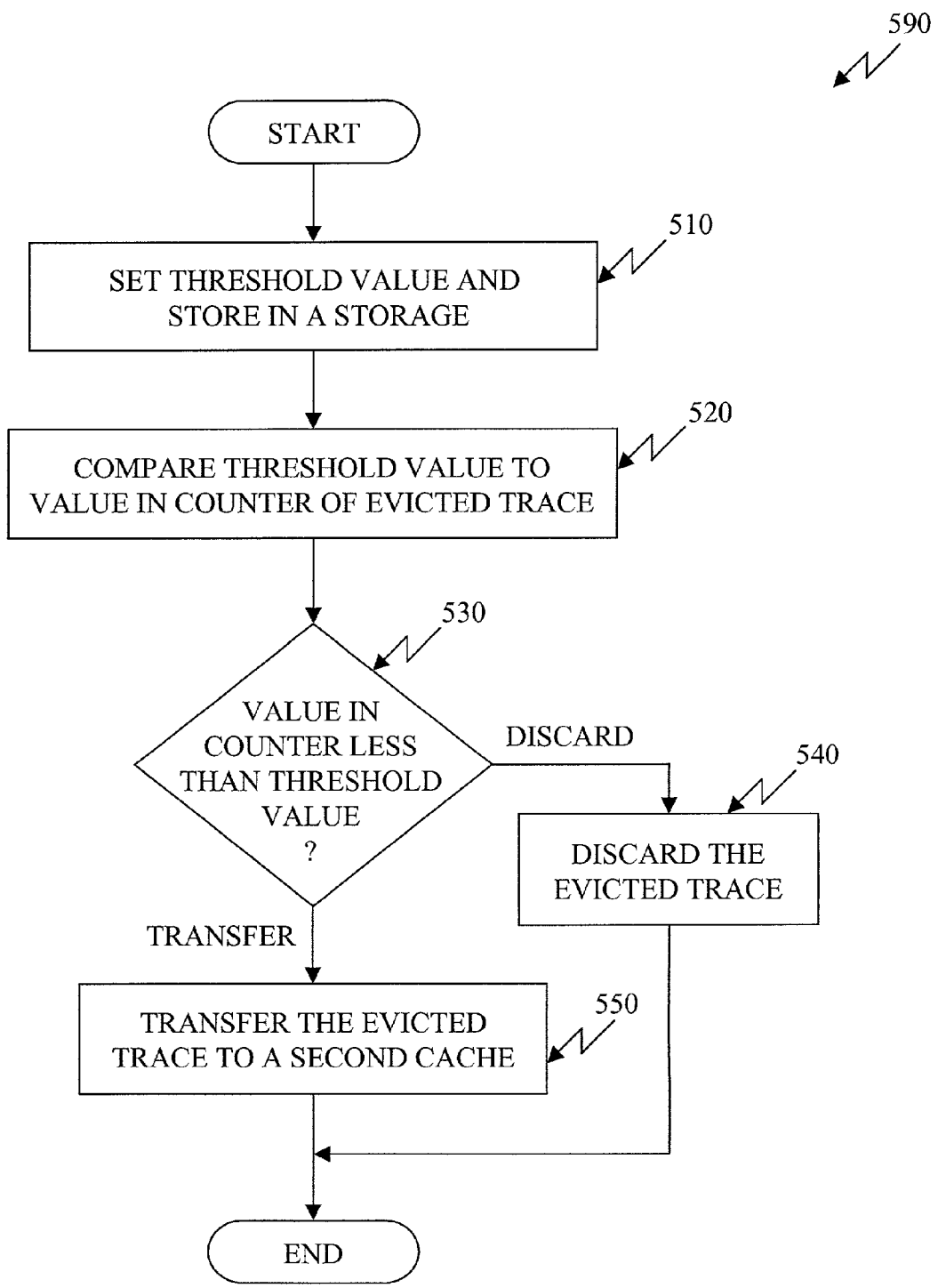
FIG. 5 is a flowchart illustrating Block 490 in FIG. 4B according to one embodiment of the present invention.

FIG. 5 is a flow chart illustrating Block 490 of FIG. 4B according to one embodiment of the present invention.

Upon START, the process 490 sets a threshold value and stores it in a storage (Block 510). The threshold may be fixed or may be dynamically adjusted. Next, the process 490 compares the threshold value to the value in the counter of the evicted trace (Block 520). The evicted trace may be a frequent trace or an infrequent trace. The frequent trace is sometimes called hot trace and the infrequent trace, cold trace. It is hot because the number of access of this trace is more than or equal to the threshold value. The infrequent trace is cold because the number of access to this trace is below the set threshold level. The process 490 then determines to see whether the value in the counter is less than the threshold value (Block 530). If yes, the process 490 discards (i.e., overwritten) the evicted trace (Block 540) is then terminated. Otherwise, the process 490 transfers the evicted trace to the second cache (Block 550) and is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
a cache manager to manage a transfer of a trace;
a first cache coupled to the cache manager to evict the trace based on a replacement mechanism;
a second cache coupled to the cache manager to receive the evicted trace based on a first number or accesses to the trace; and
a level 2 (L2) cache to receive the trace transferred from one of the first and second caches using a second number of accesses to the trace;
wherein the trace is transferred from the second cache to the 12 cache when a second threshold value is less than the second number of accesses to the trace, the second threshold value being fixed or dynamically adjusted.

2. The apparatus of claim 1 wherein the cache manager comprises a usage counter to count the first number of accesses to the trace.

3. The apparatus of claim 1 wherein the cache manager comprises a comparator to compare a first threshold value to the first number of accesses to the trace, the first, threshold value being a first fixed number or a first dynamically adjusted number.

4. The apparatus of claim 3 wherein the trace is transferred from the first cache to the second cache when the first threshold value is less than the first number of accesses to the trace.

5. The apparatus of claim 3 wherein the trace is discarded from the first cache when the first threshold value is more than or equal to the first number of accesses to the trace.

6. The apparatus of claim, 1 wherein the trace is discarded from the second cache when a second threshold value is more than the second number of accesses to the trace, the second threshold value being a fixed number or a dynamically adjusted number.

7. The apparatus of claim 1 wherein the second number of accesses to the trace is a number of accesses to the trace counting from a time the trace first enters the first cache.

8. The apparatus of claim 1 wherein the replacement mechanism is a Least Recently Used (LRU) mechanism.

9. A method comprising:
managing a transfer of a trace;
evicting the trace based on a replacement mechanism using a first cache; and
receiving the evicted trace based on a first number of accesses to the trace using a second cache;
wherein managing comprises transferring the trace from one of the first and second caches to a second level (L2) cache using a second number of accesses to the trace, and
wherein transferring comprises transferring the trace to the L2 cache when a second threshold value is less than a second number of accesses to the trace, the second threshold value being fixed or dynamically adjusted.

10. The method of claim 9 Wherein transferring comprises discarding the trace when a second threshold value is more than a second number of accesses to the trace, the second threshold value being a fixed number or a dynamically adjusted number.

11. The method of claim 9 wherein the second number of accesses to the trace is a number of accesses to the trace counting from a time the trace first enters the first cache.

12. The method of claim 9 wherein managing comprises counting the first number of accesses to the trace.

13. The method of claim 9 wherein managing comprises comparing a first threshold value to the first number of accesses to the trace, the first threshold value being a first fixed number or a first dynamically adjusted number.

14. The method of claim 13 wherein managing further comprises transferring the trace From the first cache to the second cache when the first threshold value is less than the first number of accesses to the trace.

15. The method of claim 13 wherein managing further comprises discarding the trace from the first cache when the first threshold value is more than or equal to the first number of accesses to the trace.

16. The method of claim 9 wherein the replacement mechanism is a Least Recently Used (LRU) mechanism.

17. A system comprising:
an execution unit; and
a cache unit couple to the execution unit to provide the execution unit a trace, the cache unit comprising:
a cache manager to manage a transfer of the trace,
a first cache coupled to the cache manager to evict the trace based on a replacement mechanism,
a second cache coupled to the cache manager to receive the evicted trace based on a first number of accesses to the trace, and
a level 2 (L2) cache to receive the trace transferred from one of the first and second caches using a second number of accesses to the trace;
wherein the trace is transferred from the second cache to the L2 cache when a second threshold value is less than the second number of accesses to the trace, the second threshold value being fixed or dynamically adjusted.

18. The system of claim 17 wherein the cache manager comprises a usage counter to count the first number of accesses to the trace.

19. The system of claim 17 wherein the cache manager comprises a comparator to compare a first threshold value to the first number of accesses to the trace, the first threshold value being a first fixed number or a first dynamically adjusted number.

20. The system of claim 19 wherein the trace is transferred from the first cache to the second cache when the first threshold value is less than the first number of accesses to the trace.

21. The system of claim 19 wherein the trace is discarded from the first cache when the first threshold value is more than or equal to the first number of accesses to the trace.

22. The system of claim 17 wherein the trace is discarded from the second cache when a second threshold value is more than the second number of accesses to the trace, the second threshold value being a fixed number or a dynamically adjusted number.

23. The system of claim 17 wherein the second number of accesses to the trace is a number of accesses to the trace counting from a time the trace first enters the first cache.

24. The system of claim 17 wherein the replacement mechanism is a Least Recently Used (LRU) mechanism.

* * * * *

UNITED STATES PATENT AND TRADEMARK OFFICE
CERTIFICATE OF CORRECTION

PATENT NO.       : 7,260,684 B2
APPLICATION NO.  : 09/764810
DATED            : August 21, 2007
INVENTOR(S)      : Mendelson et al.

It is certified that error appears in the above-identified patent and that said Letters Patent is hereby corrected as shown below:

Column 1, at line 33, delete "modem" and insert --modern--.

Column 8, at line 20, delete "or" and insert --of--.

Column 8, at line 26, delete "12" and insert --L2--.

Column 9, at line 16, delete "From" and insert --from--.

Signed and Sealed this

Twenty-ninth Day of April, 2008

JON W. DUDAS
*Director of the United States Patent and Trademark Office*